UNITED STATES PATENT OFFICE.

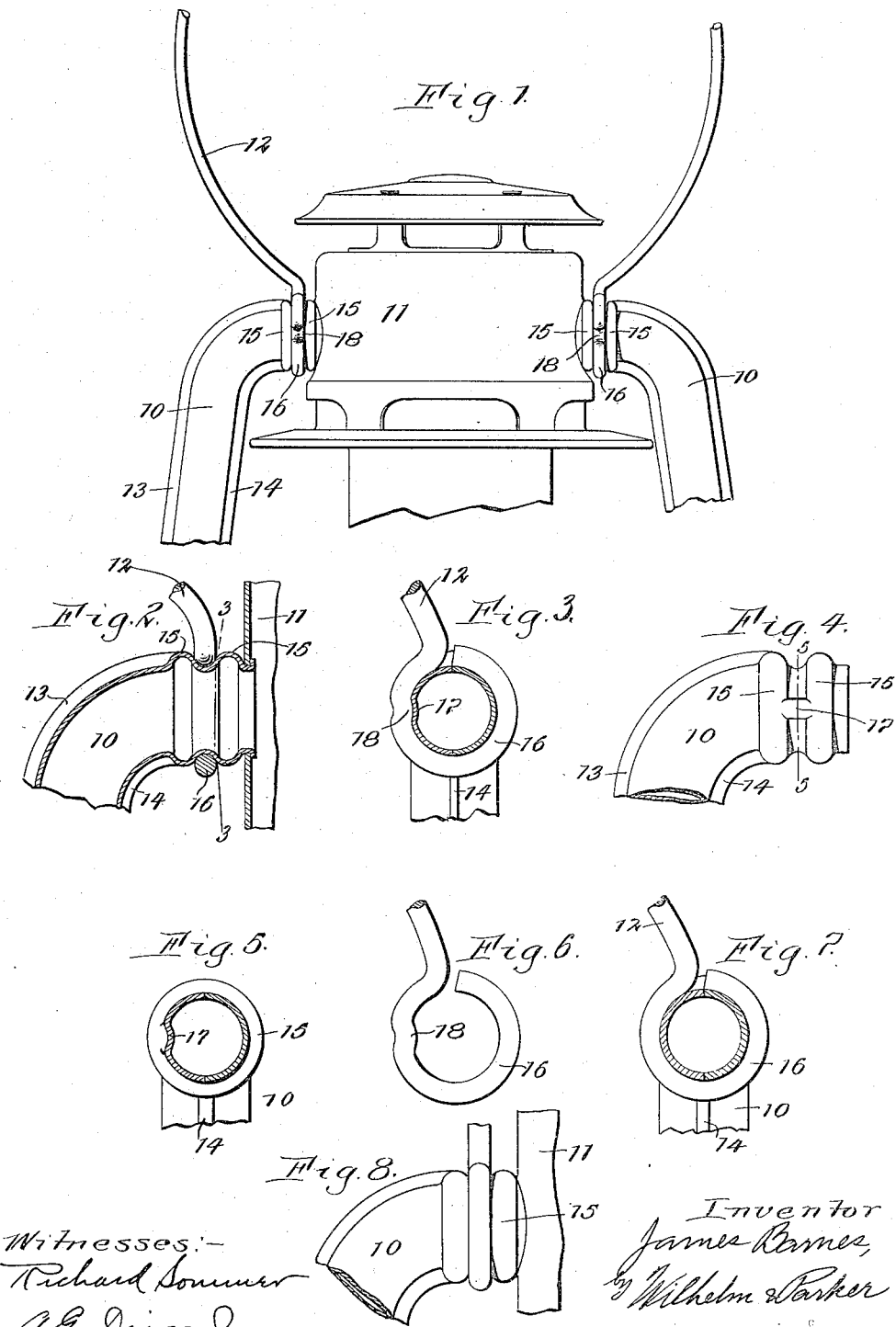

JAMES BARNES, OF ROCHESTER, NEW YORK, ASSIGNOR, BY MESNE ASSIGNMENTS, TO R. E. DIETZ COMPANY, OF NEW YORK, N. Y., A CORPORATION OF NEW YORK.

TUBULAR LANTERN.

1,167,735.     Specification of Letters Patent.     Patented Jan. 11, 1916.

Application filed May 13, 1914. Serial No. 838,205.

*To all whom it may concern:*

Be it known that I, JAMES BARNES, a citizen of the United States, residing at Rochester, in the county of Monroe and State of New York, have invented a new and useful Improvement in Tubular Lanterns, of which the following is a specification.

This invention relates to that class of tubular lanterns in which the ends of the bail, which are bent to form eyes, are mounted on the upper portions of the air tubes, and has for its object to connect the bail ends with the tubes in such manner that the bail can be turned on the tubes but is held yieldingly in its upright position.

In the accompanying drawings: Figure 1 is a front elevation of the upper portion of a tubular lantern provided with this improvement. Fig. 2 is a sectional elevation of the upper end of one of the tubes and the adjacent end of the bail, on an enlarged scale. Fig. 3 is a vertical section on line 3—3, of Fig. 2. Fig. 4 is a detached elevation of the upper end of one of the tubes. Fig. 5 is a cross section on line 5—5, Fig. 4. Fig. 6 is an elevation of one end of the bail. Fig. 7 is a sectional view of a tube and the surrounding eye of the bail, showing a modified form of the invention. Fig. 8 is a fragmentary elevation of the same parts at right angles to Fig. 7.

10 represents the tubes, 11 the air chamber to which the upper ends of the tubes are secured in the usual manner, and 12 is the bail. The tubes are shown as being composed of stamped halves united by seams 13 and 14 on the outer and inner sides of the tubes in a well known manner, but may be of any other suitable construction.

Each tube is formed near the air chamber with two annular beads 15 which are formed integrally with the tube or bent on the same by means of dies or other suitable tools and are arranged at such a distance from each other that the annular groove between the beads is suitable to receive the eye 16 of the bail between them. The latter fits snugly upon the round portion of the tube between these beads so that the bail can be turned thereon. The eye of the bail is applied to the tube in a partly open condition and then closed upon the tube by means of dies.

The tube is provided between the beads with an external transverse depression or indentation 17 and the eye of the bail is provided on its inner side with a corresponding projection 18 which is so arranged that it springs into the depression 17 when the bail has reached its upright position and holds the bail yieldingly in that position, preventing the bail from falling down but permitting the bail to be turned down by applying sufficient force for that purpose.

The external locking indentation 17 in the tube and the internal locking projection 18 in the eye of the bail may in some cases be omitted, as represented in Figs. 7 and 8. In this construction the circular eye of the bail is held only by friction in position on the tube.

I claim as my invention:

1. In a tubular lantern, the combination with round lantern tubes each provided near its upper end with a pair of spaced annular beads which are formed integrally on the tube, of a bail having eyes at the lower ends thereof which encircle and are rotatably mounted on the tubes between the beads thereof.

2. In a tubular lantern, the combination with round tubes each having near its upper end a pair of spaced annular beads which are formed integrally on the tubes and a locking depression between said pair of beads, of a bail having its ends bent to form eyes which are mounted upon the tubes between the beads thereof and provided on their inner sides with integral locking projections which enter said depressions when the bail is in its upright position.

3. In a tubular lantern, the combination with lantern tubes each provided near its upper end with a pair of spaced annular beads formed integrally on the tube, of a bail having the lower end thereof bent to form expansible eyes which encircle the tubes and are rotatably mounted on said tubes between the beads thereof.

Witness my hand in the presence of two subscribing witnesses.

JAMES BARNES.

Witnesses:
    F. McCUTCHEN,
    WALLACE I. MILLER.

Copies of this patent may be obtained for five cents each, by addressing the "Commissioner of Patents, Washington, D. C."